US008284737B2

(12) United States Patent
Rosen et al.

(10) Patent No.: US 8,284,737 B2
(45) Date of Patent: Oct. 9, 2012

(54) METHOD OF BUFFERING TO REDUCE MEDIA LATENCY IN GROUP COMMUNICATIONS ON A WIRELESS COMMUNICATION NETWORK

(75) Inventors: Eric C. Rosen, Solana Beach, CA (US); Mark A. Maggenti, Del Mar, CA (US); Douglas M. Crockett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/552,828

(22) Filed: Sep. 2, 2009

(65) Prior Publication Data

US 2010/0011122 A1 Jan. 14, 2010

Related U.S. Application Data

(60) Continuation-in-part of application No. 11/360,104, filed on Feb. 22, 2006, now abandoned, and a continuation-in-part of application No. 10/807,990, filed on Mar. 23, 2004, now Pat. No. 7,689,822, which is a division of application No. 10/007,115, filed on Nov. 8, 2001, now Pat. No. 7,069,031, which is a division of application No. 09/518,776, filed on Mar. 3, 2000, now abandoned.

(51) Int. Cl.
*H04B 7/216* (2006.01)
(52) U.S. Cl. ....................................................... 370/335
(58) Field of Classification Search ................... 370/335
See application file for complete search history.

(56) References Cited

U.S. PATENT DOCUMENTS

| 4,012,597 | A | * | 3/1977 | Lynk et al. | 455/512 |
| 5,333,299 | A | * | 7/1994 | Koval et al. | 713/400 |
| 5,717,830 | A | * | 2/1998 | Sigler et al. | 455/426.1 |
| 5,842,125 | A | * | 11/1998 | Modzelesky et al. | 455/426.1 |
| 5,844,885 | A | * | 12/1998 | Grob et al. | 370/216 |
| 5,867,653 | A | * | 2/1999 | Aras et al. | 709/204 |

(Continued)

FOREIGN PATENT DOCUMENTS

CN 1509527 A 6/2004

(Continued)

OTHER PUBLICATIONS

International Preliminary Report on Patentability—PCT/US2007/062520, International Preliminary Examining Authority, May 27, 2008.

(Continued)

*Primary Examiner* — Ayaz Sheikh
*Assistant Examiner* — Hai-Chang Hsiung
(74) *Attorney, Agent, or Firm* — Raphael Freiwirth

(57) ABSTRACT

A system and method for minimizing latency for direct group communications, such as push-to-talk (PTT) calls, among a group of wireless telecommunication devices on a wireless telecommunication network. The wireless telecommunication device has a dormant state without an open dedicated traffic channel for communications therefrom and an active state in which the wireless devices opens a dedicated traffic channel for an outgoing communication from the wireless telecommunication device, to include a direct communication stream. Either the wireless telecommunication device or an intermittent communication server for group communication streams can buffer the initial communication data of a group communication stream while the sending and/or receiving wireless telecommunication device changes from a dormant state to an active state with an open dedicated traffic channel.

24 Claims, 6 Drawing Sheets

U.S. PATENT DOCUMENTS

| | | | |
|---|---|---|---|
| 5,884,196 A * | 3/1999 | Lekven et al. | 455/574 |
| 6,321,095 B1 * | 11/2001 | Gavette | 455/517 |
| 6,477,150 B1 * | 11/2002 | Maggenti et al. | 370/312 |
| 6,738,617 B2 * | 5/2004 | Rosen et al. | 455/418 |
| 6,781,963 B2 | 8/2004 | Crockett et al. | |
| 6,898,640 B1 * | 5/2005 | Kurita et al. | 709/238 |
| 6,904,228 B2 | 6/2005 | Nishimura et al. | |
| 6,904,288 B2 | 6/2005 | Rosen et al. | |
| 2002/0058523 A1 | 5/2002 | Maggenti et al. | |
| 2002/0172165 A1 | 11/2002 | Rosen et al. | |
| 2003/0152040 A1 | 8/2003 | Crockett et al. | |
| 2005/0032538 A1 | 2/2005 | Noel et al. | |
| 2006/0003781 A1 | 1/2006 | Jin et al. | |
| 2007/0195735 A1 | 8/2007 | Rosen et al. | |

FOREIGN PATENT DOCUMENTS

| | | |
|---|---|---|
| EP | 0583018 | 2/2005 |
| EP | 1523200 | 4/2005 |
| EP | 1505844 | 9/2005 |
| JP | 2004526392 | 8/2004 |
| JP | 2005057785 A | 3/2005 |
| KR | 1020030094422 | 12/2003 |
| KR | 1020050016172 | 2/2005 |
| WO | WO0167675 | 9/2001 |
| WO | WO02093778 | 11/2002 |
| WO | WO02093948 | 11/2002 |
| WO | WO2007101043 | 9/2007 |

OTHER PUBLICATIONS

International Search Report—PCT/US2007/062520, International Searching Authority—European Patent Office, Jul. 23, 2007.

Written Opinion—PCT/US2007/062520, International Searching Authority—European Patent Office, Jul. 23, 2007.

International Search Report and Written Opinion—PCT/US2010/047314, International Search Authority—European Patent Office—Jan. 11, 2011.

* cited by examiner

US 8,284,737 B2

METHOD OF BUFFERING TO REDUCE MEDIA LATENCY IN GROUP COMMUNICATIONS ON A WIRELESS COMMUNICATION NETWORK

CLAIM OF PRIORITY UNDER 35 U.S.C. §120

The present application for patent is a continuation-in-part of patent application Ser. No. 11/360,104 entitled "METHOD OF BUFFERING TO REDUCE MEDIA LATENCY IN GROUP COMMUNICATIONS ON A WIRELESS COMMUNICATION NETWORK" filed Feb. 22, 2006, and assigned to the assignee hereof and hereby expressly incorporated by reference herein in its entirety. The present application for patent is also a continuation-in-part of patent application Ser. No. 10/807,990 entitled "COMMUNICATION DEVICE FOR PROVIDING SECURITY IN A GROUP COMMUNICATION NETWORK" filed Mar. 23, 2004, which is a divisional of and claims priority to U.S. patent application Ser. No. 10/007,115, now U.S. Pat. No. 7,069,031, filed Nov. 8, 2001, which is a divisional of and claims priority to U.S. patent application Ser. No. 09/518,776, filed Mar. 3, 2000, and assigned to the assignee hereof and hereby expressly incorporated by reference herein.

BACKGROUND OF THE INVENTION

1. Field of the Invention

The present invention generally relates to wireless telecommunication networks. More specifically, the present invention relates to a system and method for buffering initial data for direct group communications, such as Push-to-Talk group communications, in a wireless telecommunication network to reduce latency.

2. Description of the Related Art

In a wireless network, the users of wireless communication devices communicate over an air-interface to a central computer. This may be done directly, as in the case of a wireless LAN in an office environment, or it may be done through cellular infrastructure equipment, as in the case of a wireless telephone application. One type of personal communication system is a push-to-talk (PTT) system between mobile wireless communication devices. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor. A specific PTT group of recipient devices for the communicating wireless device is commonly set up by the carrier and the wireless devices themselves do not allow the modification of the group, i.e. to include or drop individuals from the group, or to purposely direct a communication to be received by any fewer members than the entire group.

To set up the PTT call, communication to begins with the press of the PTT button on the handset, as opposed to a standard cellular call, and the infrastructure forms a call by combining separate point-to-point connections between each endpoint at a managing entity, such as a server, deployed on the network carrier infrastructure. For purposes of validating the connection, pressing the PTT button originates provides the person with information indicating the availability (presence) of the target user. If the target user is available, the originator receives an immediate indication (such as an audible tone) that the target user is available and the originator can begin speaking. The call originator's voice is then sent through the carrier's network to the target's handset.

One problem arises in a push to talk system in that the person desiring to speak may press the PTT button and have to wait for an acknowledgement that the wireless telecommunication device can send out the group communication. In a common configuration, the device will not send any message until the active dedicated traffic channel is established, which typically means that communication with the appropriate communication equipment has been established, and at least one member of the target group of wireless devices is available to receive the group communication. If the latency delay to set up the dedicated traffic channel is significant, the person will notice the delay. It is thus to such a system and method of reducing latency for the setup of a PTT or direct group communication that the present invention is primarily directed.

SUMMARY OF THE INVENTION

Briefly described, the present invention is a system and method for minimizing latency for direct group communications, such as push-to-talk (PTT) calls, among a group of wireless telecommunication devices on a wireless telecommunication network. The wireless telecommunication device has a dormant state without an open dedicated traffic channel for communications therefrom and an active state in which the wireless devices opens a dedicated traffic channel for an outgoing communication from the wireless telecommunication device, to include a direct communication stream. Either the wireless telecommunication device or an intermittent communication server for group communication streams can buffer the initial communication data of a group communication stream while the wireless telecommunication device changes from a dormant state to an active state with an open dedicated traffic channel.

The system and method provides for media buffering prior to or during transmission within a group communication system, the buffering occurring either at the wireless telecommunication device or at a group communication server. The buffering is used to hide delays from the talker associated with bringing up wireless device traffic channels during dormancy wakeup. In particular, client-based media buffering is used to hide the delay associated with bringing up the talker's traffic channel during dormancy wakeup while media buffering is used to hide the delay associated with bringing up the listeners' traffic channels during dormancy wakeup.

In general, the buffering of real-time media in a traditional voice over packet-data application can also be used to smooth network jitter. In one embodiment, the wireless device can implement a media play-out buffer to compensate for network jitter or other set up problems.

In one embodiment, a wireless telecommunication device is able to direct a single group communication stream to a designated group of the plurality of wireless telecommunication devices across wireless telecommunication network, the wireless telecommunication device having a dormant state without an open dedicated traffic channel for communications therefrom, and an active state in which the wireless device opens a dedicated traffic channel for an outgoing communication from the wireless telecommunication device, to include a direct communication stream from that wireless telecommunication device. The wireless telecommunication device further includes a data store for the selectively buffering the initial communication data of a group communication stream at least while the wireless telecommunication device changes from a dormant state to an active state with an open dedicated traffic channel.

In one embodiment, the system for buffering initial group communication data from a wireless telecommunication device on a wireless telecommunication network includes a plurality of wireless telecommunication devices, wherein at least one wireless device able to direct a single group communication stream to a designated group of the plurality of wireless telecommunication devices across the wireless telecommunication network, the wireless telecommunication device having a dormant state without an open dedicated traffic channel for communications therefrom, and an active state in which the wireless device opens a dedicated traffic channel for an outgoing communication from the wireless telecommunication device, to include a direct communication stream from that wireless telecommunication device. The system also includes a communication server that selectively receives incoming group communication streams of data and sends group communication data to other members of the target group for the group communication stream, with the communication server further including a data store for selectively buffering the communication data of a group communication stream intended for a dormant wireless telecommunication device, and at least some communication data is buffered while a dedicated traffic channel is opened to a dormant wireless telecommunication device.

In one embodiment, the method for buffering initial group communication data from a wireless telecommunication device on a wireless telecommunication network includes the steps of starting a single group communication stream from a sending wireless telecommunication device to a designated group of the plurality of wireless telecommunication devices across the wireless telecommunication network through a communication server, the sending wireless telecommunication device having a dormant state without an open dedicated traffic channel for communications therefrom, and an active state in which the wireless devices has opened a dedicated traffic channel for an outgoing communication from the wireless telecommunication device, and the communication server selectively receiving incoming group communication streams of data and sending group communication data to other members of the target group for the group communication stream, then buffering communication data of a group communication stream in a data store, either at wireless device or communication server, from or to a dormant wireless telecommunication device, the initial communication data buffered at least while a dedicated traffic channel is opened to the dormant wireless telecommunication device, and then transmitting the buffered initial communication data from the data store to the target group after an active channel is opened to the sending or receiving wireless telecommunication device.

The system and method can therefore provide a push-to-talk system wherein the talker does not have to wait for an acknowledgement that the wireless telecommunication device has established a full active dedicated traffic channel so that the talker can send out the group communication. Through the use of data being sent over a signaling channel, the initial group communication data can be buffered transparently to the talker at a communication server while channels are opened to target devices. Furthermore, the buffering of the data can done at the client device and be implemented on an existing wireless telecommunication system having a group communication capability.

Other objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
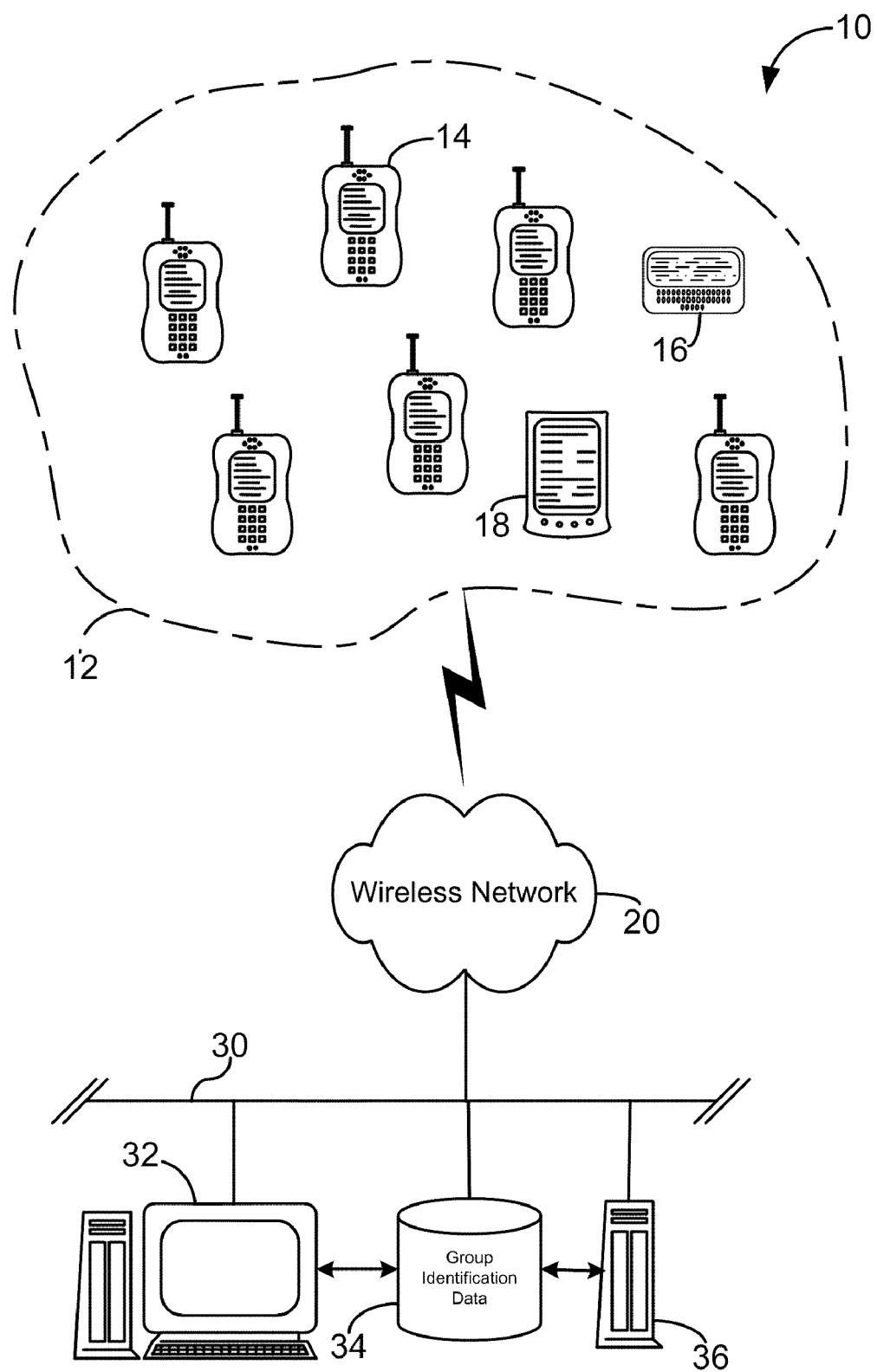
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of a wireless telecommunication system 10 between a group of wireless telecommunication devices (target set 12) on a wireless network 20. Here, the one or more wireless telecommunication devices are in a PTT group, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set 12 of one or more other wireless telecommunication devices with the plurality. For example, the target set for cellular telephone 14 can all devices in the target set 12 or a subset thereof, such as pager 16 and PDA 18.

In particular, the system 10 can deliver media, such as voice data, multimedia, or other applicants, to very large push-to-talk (or other similar services) calls defined in ad-hoc fashion. These PTT calls can involve a very large number of call participants (several hundred) who can be scattered across an operator's wireless network 20 or who may all be located in a small number of sectors on the same network resources. Furthermore, the target set 12 (or group) can include only one target wireless device. In such instance, the PTT communication will only travel from one wireless device to another via the PTT system.

In one embodiment, a group communication server 32 selectively receives requests to bridge direct communications between the communicating wireless telecommunication devices 14,16,18 and the one or more other wireless telecommunication devices in the target set 12 designated for the communicating wireless telecommunication device. The communication server 32 then selectively bridges the requested direct communication, such as a PTT voice communication. The identity of the target set 12 is selectively available to the group communication server 32, such as being resident on the group communication server 32 or in a connected database 34, or possibly on another computer device, such as packet flow-control server 36 (as is common in network infrastructure).

The system 10 minimizes latency for direct group communications among a group of wireless telecommunication devices (set 12) on a wireless network 20. Each wireless telecommunication device 14,16,18 is able to direct a single group communication stream to a designated group (such as all devices of set 12) of the plurality of wireless telecommunication devices, and as further described herein, each wireless telecommunication device 14,16,18 selectively requests and then receiving an open dedicated broadcast channel for an outgoing communication from the wireless telecommunication device, which can include a direct communication stream. The communication server 32 that receives the single communication stream from a communicating wireless device typically creates a group communication to all wireless telecommunication devices 14,16,18 of the designated group.

The wireless telecommunication device 14,16,18 has a dormant state without an open dedicated traffic channel for communications therefrom, and an active state in which the wireless devices opens a dedicated traffic channel for an outgoing communication, to include a direct communication stream such as a PTT communication wherein the wireless telecommunication device further including a data store (such as local database 90 or memory 88 on the wireless device 14) for the selectively buffering the initial communication data of a group communication stream, the initial communication data buffered at least while the wireless telecommunication device 14,16,18 changes from a dormant state to an active state with an open dedicated traffic channel. The wireless telecommunication device 14,16,18 sends the buffered initial group communication data after a predetermined period of time has elapsed, or can sends the buffered initial group communication data after an active dedicated traffic channel is opened. The data store (located at either the wireless device or the communication server 32) further purges the buffered initial communication data upon interruption of the group communication stream, as described further below. Unless otherwise stated, the term "buffering" in this application refers to buffering prior to transmission (as opposed to buffering prior to play-out or presentation at a vocoder).

Figure 2:
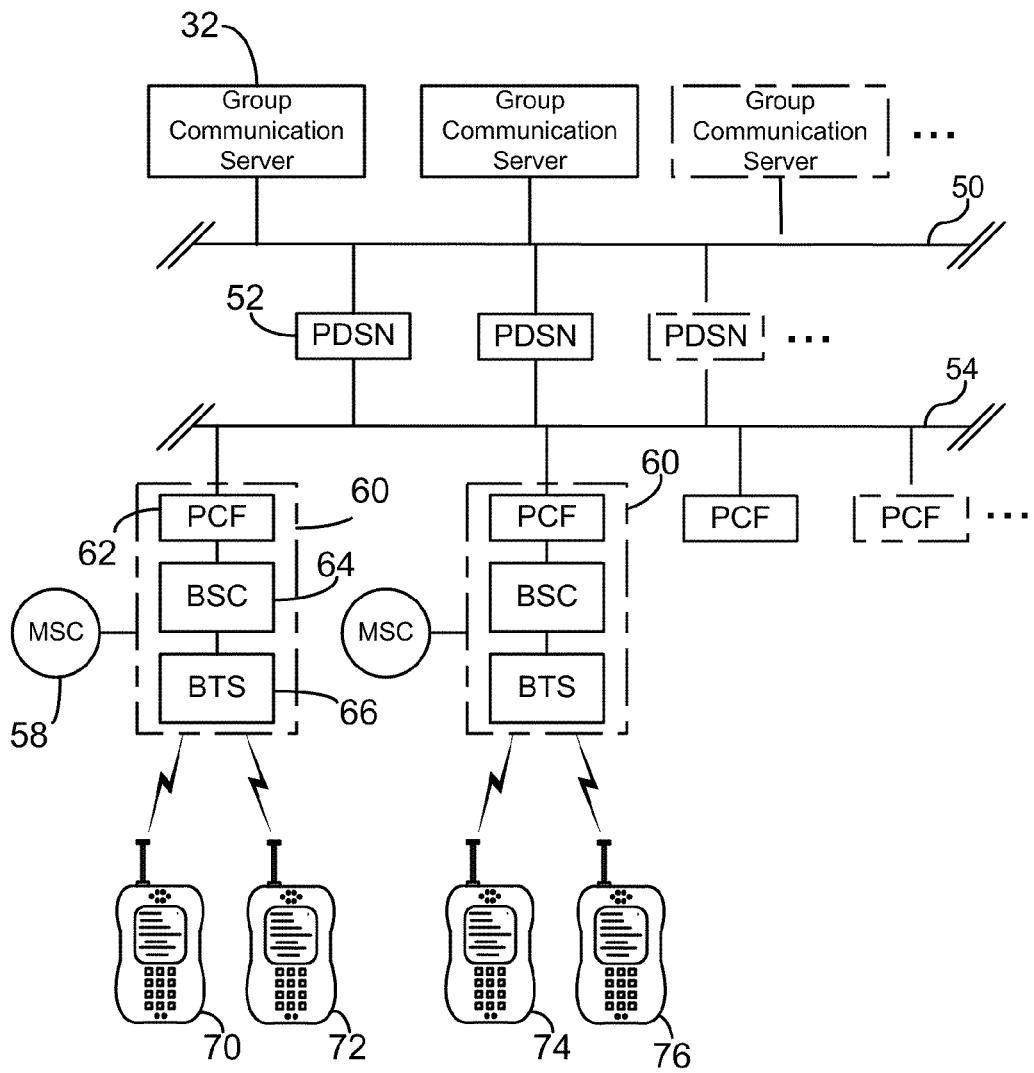
FIG. 2 is a representative diagram of one embodiment of a wireless network in a common cellular telecommunication configuration, having a series of group communication servers control communications between the wireless telecommunication devices of PTT group members.

There are typically one or more intermittent communication devices that bridge communication streams between the communication server 32 and the group of wireless telecommunication devices 12, as is shown in FIG. 2, and the communication server 32 can further determine which member wireless telecommunication devices are able to determine the best mode of communication with the wireless devices 14,16, 18. The communication server 32 will then direct the one or more intermittent communication devices to send data packets to those wireless telecommunication devices of the set 12.

FIG. 2 is a representative diagram of one embodiment of a wireless network in a common cellular telecommunication configuration, having a group communication server 32 control communications between the wireless devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions (such as CDMA) from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art.

In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side LAN 30 component that is aware of and/or can retrieve the identity of the members of the set 12, or direct the identity of the members of the set 12 to another computer device.

In a PTT embodiment, the wireless system 10 allows a dispatch voice service that operates over standard commercial wireless infrastructure (CDMA, FDMA, GSM, etc.). In a dispatch model, communication between endpoints (wireless devices 14,16,18) occurs within virtual groups, wherein the voice of one "talker" is broadcast to one or more "listeners". A single instance of this type of communication is commonly referred to as a "dispatch call." A call is an instantiation of a "group," which defines the characteristics of a call. A group in essence is defined by a member list and associated information, such as group name or group ID. In the absence of a wireless multicast channel, each group is formed by the combination of separate point-to-point connections between each endpoint and group communication server(s) 32 assigned to manage the call.

Each region of the PTT infrastructure is deployed over a specific portion of the carrier packet data network. The group communication server(s) 32 within the region may be routing traffic between one or more PDSNs 52 in the carrier network 54. A "direct call" is a call in which there are only two members, a call originator and a call target, that still use the PTT system. For this call type, the most challenging scenario for meeting performance requirements is the case when the direct call is placed with both the originator and target handset have dormant packet-data connections, i.e. the wireless devices 14,16,18 do not have an open dedicated channel. Conversely, the originator's and/or the target's packet-data connection can be in the active state and dedicated traffic channels are available at the time the direct call is placed. The dormant-to-dormant scenario is the one that provides the greatest challenge in meeting performance requirements and preventing significant latency in call set up, as it more fully described herein.

Figure 3:
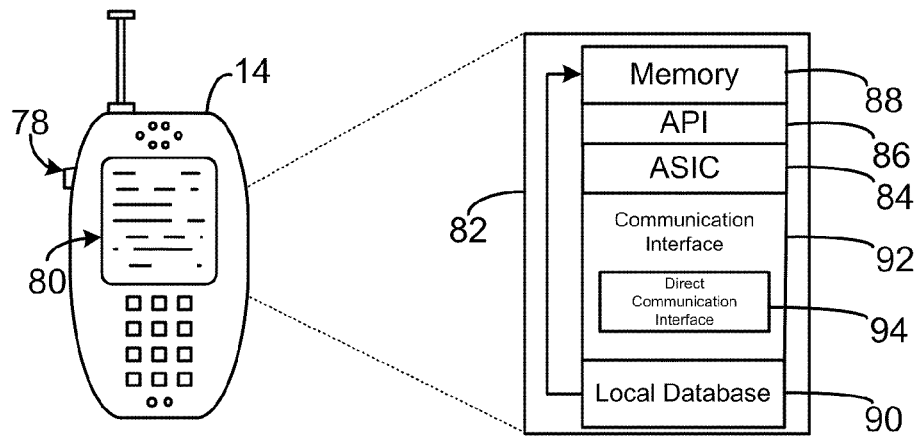
FIG. 3 is a block diagram illustrating the computer platform of the wireless telecommunication device with PTT capability.

FIG. 3 is a block diagram illustrating one embodiment of the wireless telecommunication device being a cellular telephone 14 with a PTT button 78 that opens the direct communication to the target set 12 of devices. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW®) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The local database 90 or memory can comprise a data store for buffered direct group communication data. The wireless telephone typically will open a full duplex channel for telecommunication, and in some instances, will communicate via a half-duplex channel, only being able to talk or receive a voice stream.

In this embodiment of the wireless device 14, the computer platform 82 also includes a communication interface 92 that includes a direct communication interface 94 that can open the direct communication channel from the wireless device. The direct communication interface 94 can also be part of the standard communication interface for the wireless device which ordinarily carries the voice and data transmitted to and from the wireless device. The direct communication interface 92 typically is comprised of hardware as is known in the art.

Figure 4:
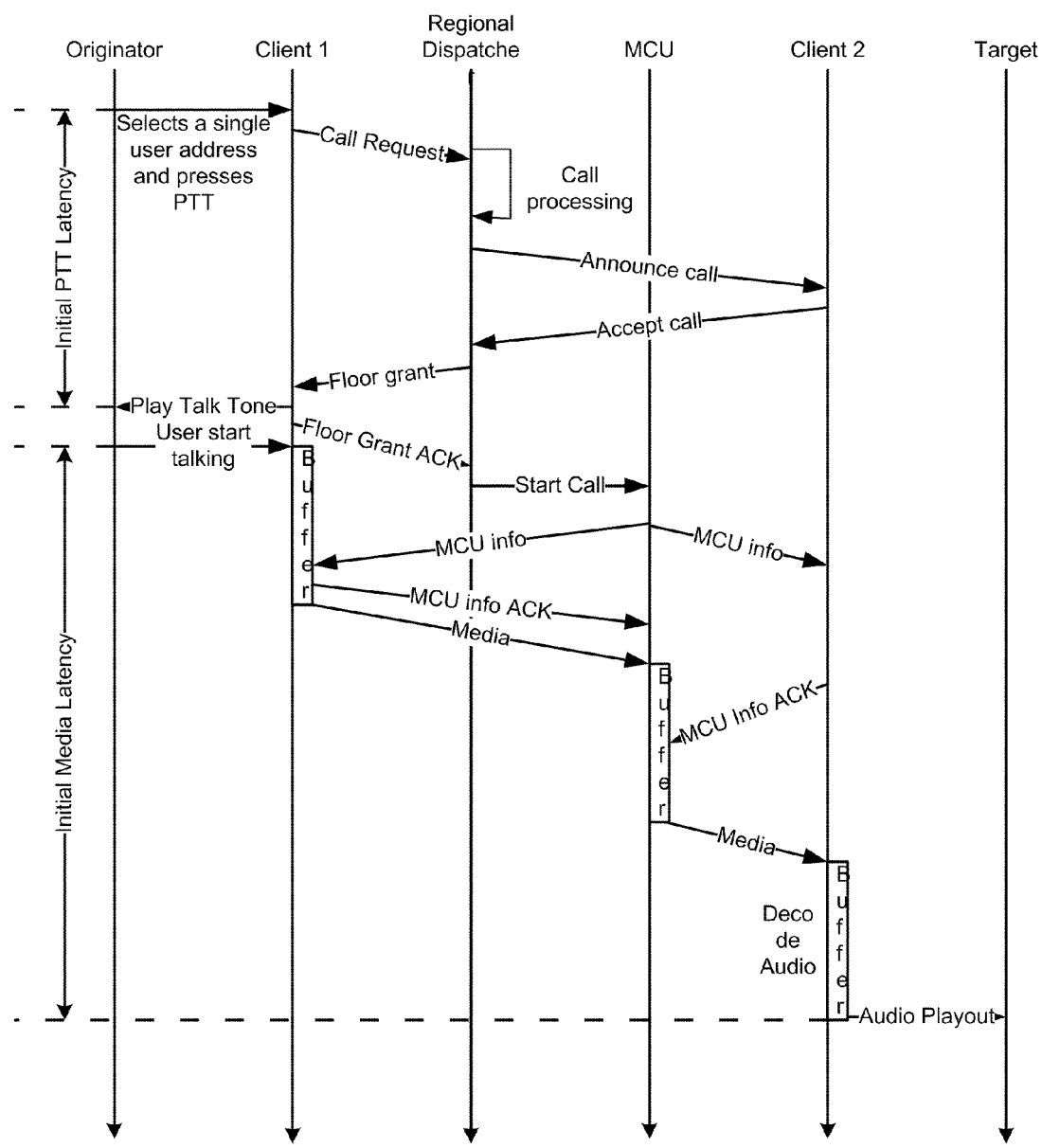
FIG. 4 is a call-progress diagram for application-layer signaling for establishing a PTT communication and illustrating the initial latencies.

FIG. 4 is a call-progress diagram for application-layer signaling for establishing a PTT communication. It should be noted that call setup signaling can occur via a formal broadcast channel, as opposed to just a generic shared forward link channel such as the Control Channel. For example, in one extant telecommunications system, the system uses a Control Channel (CC) and a separate Broadcast Channel (BCH). The critical performance metrics for direct calls include an initial PTT latency (as shown) where a delay is realized between the time the user presses the PTT button and the time the user is notified (via either an audio or visual means) that the user is granted permission to speak. There is also an initial media latency (as shown) comprised of a delay that is realized between the time the originator starts speaking following the floor grant after the call is first established until to the time the target hears the originator's speech.

The application-layer signaling shown in FIG. 4 for establishing a direct call illustrates the application-layer messaging that is exchanged to establish a direct PTT call. The diagram of FIG. 4 does not identify any physical-layer signaling mechanisms as this system can be implemented on a variety of different physical systems.

Figure 5:
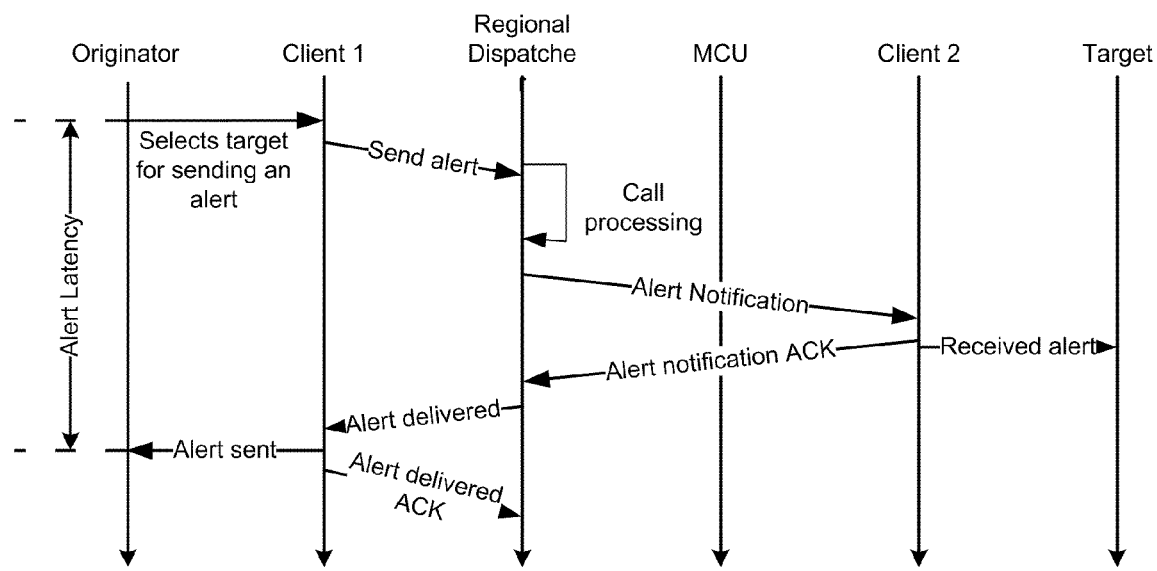
FIG. 5 is a call-progress diagram for application-layer signaling for establishing an alert.

FIG. 5 is a call-progress diagram for application-layer signaling for establishing an alert. An "alert" is a call type that provides a mechanism by which a user notifies another user of a desire to communicate in a direct PTT call. An alert call is completed after a few short application-layer messages are exchanged at the originator, the group communication server 32 and the target wireless device 12,14,16,18. As described for direct call types, the most challenging scenario for meeting performance requirements for alerts is also when the alert is sent and both the originator and target handset have dormant packet-data connections, i.e. no active dedicated channels. Thus, the alert latency (as shown) is the delay from the time the user presses the PTT button 78 to when the user is notified (via either an audio or visual means), indicating the status of the alert delivery. An alert can be established at the physical-layer so this diagram does not identify any physical-layer signaling mechanisms.

Figure 6:
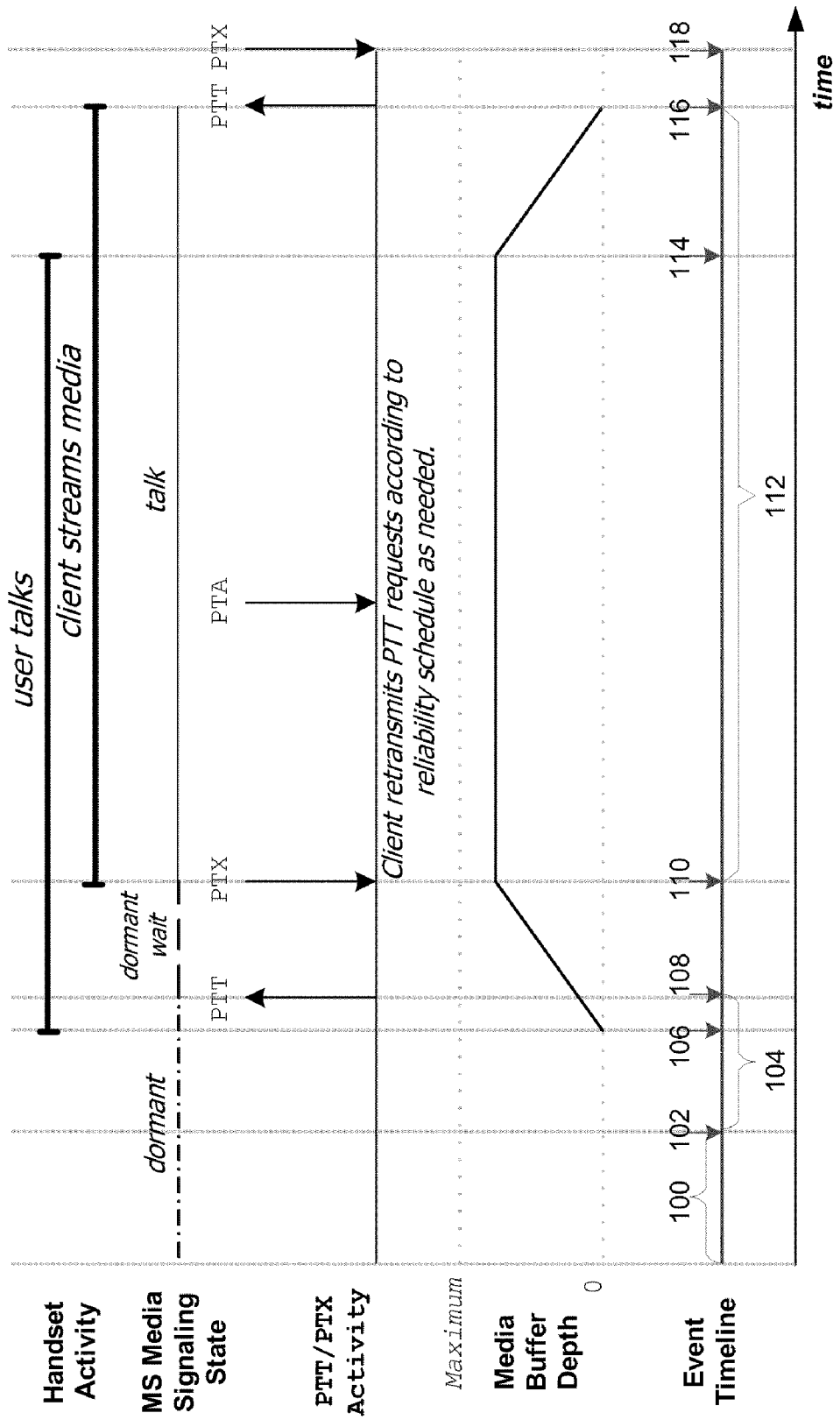
FIG. 6 is a communication progress diagram illustrating a client-media buffering event timeline.

FIG. 6 is a communication progress diagram illustrating a client-media buffering event timeline. In one embodiment, the client-managing software resident on the computer platform 82 implements a media transmission queue that can buffer media, typically for up to eight seconds, during dormancy wakeup. Within this device embodiment, buffering is controlled through the relative settings of the PTX Dormancy Response and wakeup timers. Specifically, media is buffered at the device from the point when the PTX Dormancy Response Timer expires until the point when the Wakeup Timer expires. In general, the PTX Dormancy Response Timer is less than or equal to the Wakeup Timer. If these timers are configured to be equal in value, no CM media buffering is performed. In general, the group dormancy wakeup transition proceeds in a straightforward manner. The Group is dormant until the User presses Push-To-Talk button 78 on "talker" client. Talker client then brings up traffic channel and transmits the PTT request. The communication server 32 receives PTT request and decides to grant floor. The communication server 32 initializes PTX Dormancy Response, Wakeup, and Late Riser timers, and then begins sending the wakeup requests to all group listener participants. The PTX Dormancy Response Timer expires and the communication server 32 sends PTX grant to talker client (wireless device 14,16,18). Talker client receives PTX grant, alerts user, and begins streaming media to the communication server 32. In this embodiment, the communication server 32 buffers media received from talker client. Then the Wakeup Timer expires, the communication server 32 announces talker (PTA grant) and begins relaying media to group listeners. The communication server 32 then receives a PTT release when talker client releases floor and stops streaming media, and the communication server 32 responds immediately to the talker client with a PTX confirm. The communication server then empties data store (media buffer) of talker data and announces the end of the talk-spurt (PTA release).

Buffering media at the communications server 32 allows a response to the talker client's PTT request before the group's Wakeup Timer expires. If the PTX Dormancy Response Timer is set to zero, the CM responds (essentially) immediately to the PTT request and the talker client experiences no additional delay as a result of dormancy wakeup other than the delay in re-establishing the talker's own traffic channel.

Nominally, in a typical PTT system, when a group is not dormant, the talker client receives a response to its PTT request within approximately 300 msec. However, on some systems during dormancy recovery, the PTT request cannot be sent until after the talker client's traffic channel is re-established. In such systems, there is typically a three second delay associated with re-establishing a dormant packet-data service option. Unless media is buffered at the talker client or communication server 32, the (talker) user experiences this delay as PTT latency.

To provide the user with essentially the same PTT latency experienced when a group is not dormant, in this embodiment, the talker client (such as wireless device 14) buffers media when the user presses PTT in a dormant group and the client's packet data service is dormant. If the group is dormant but the client already has an active packet-data traffic channel when the user presses PTT, the client can immediately send the PTT grant and wait for a PTX response without buffering media. Media buffering might still take place at the CM, depending on the group's configuration. Here, the diagram assumes that the group is dormant and a traffic channel is not allocated. As shown in FIG. 6, at 100, the User presses PTT, and at 102, the client begins process of re-establishing a packet data traffic channel. At 104, the client alerts the user that the floor has been granted and begins buffering media. The alert should occur within approximately 300-500 msec of the user action. At 106, a dedicated traffic channel is formally re-established. The client the transmits the PTT request to a communication server 32. At 108, the client receives a PTX grant response from the communication server 32. At 110, the client begins streaming buffered media to the communication server 32. At 112, the talker client receives a PTX grant, alerts user, and begins streaming media to the communication server 32. At 114, the user releases the PTT button 78. At 116, the client finishes streaming buffered media to the communication server 32 and transmits PTT release to the communication server 32. At 118, the client receives a PTX confirm response from the communication server 32, thus indicating the end of the talk spurt.

Given that the group is dormant, the talker client will be denied the floor only if the talker user has listen-only privileges, a higher priority user interrupts before the PTX Dormancy Response Timer expires, or the talker user is the only user remaining as an active participant in the group. If the client has the capability to query the communication server 32 for a "listen-only" condition upon joining a group, the client could deny the user's PTT request locally without signaling the communication server 32 or attempting to re-establish a traffic channel.

It is possible for a user to have talker-privileges in a dormant group and press PTT expecting to be granted the floor only to eventually be denied the floor as a result of a higher-priority user being granted the floor before the group's PTX Dormancy Response Timer expires. This type of interruption can only occur if the PTX Dormancy Response Timer is non-zero. If PTT latency during dormancy wakeup is a concern, the PTX Dormancy Response Timer should be configured to zero to take full advantage of communication server 32 media buffering and this case can be avoided.

If the user releases PTT before a PTX response is received from the communication server 32, the talker client must hold the buffered talk-spurt until a PTX response is received or the request fails. If a PTX grant response is received, the talk-spurt is streamed to the communication server 32 normally. If such request fails or a PTX deny is received after the user's release, the talk-spurt must be aborted. Talker clients must be prepared to handle various exceptional events while the user believes s/he has control of the group's floor. A talker client can receive an asynchronous PTX which ends an in-progress talk-spurt (after a PTX grant has been received) typically in at least two circumstances: The talker holds the floor past the group's Failsafe Timer, or the talker is interrupted by a higher-priority user. In these cases, the talker client must abort the talk-spurt by alerting the user of the exceptional condition, stop streaming media to the communication server 32, and transition back to the dormant state.

It should be noted that buffering media at the talker client introduces the potential for a talk-spurt to be aborted prior to or without ever receiving a PTX grant. If the talker user is talking when the abort occurs, the talker client can alert the user via the same or similar mechanism used when media is not being buffered. The user experience is similar to being interrupted, although the user might have the expectation that all of the speech spoken prior to the alert has been distributed to the group, when in fact a smaller portion (and possibly none) of the talk-spurt might have been distributed.

Talk-spurt aborts occurring prior to receipt of a PTX grant should be rare. It is very unlikely that clients will buffer enough media to extend a talk-spurt past the group's Failsafe Timer. In fact, it is possible to avoid this situation entirely by configuring the group's Failsafe Timer to a value that exceeds the client's buffering capacity. This assumes that clients transmit buffered media at the same rate at which it was collected. In practicality, media buffers will mostly be relatively small compared to the anticipated length of the maximum allowed talk-spurt. However, it is possible that if two or more users begin a talk-spurt at approximately the same time when a group is dormant, and if the users do not have equal priority and the lower priority user is initially granted the floor, the lower-priority user could experience a talk-spurt abort as described above.

Nominally, clients deliver media for transmission at the same rate at which media is collected; in other words, one packet containing 20 b msec vocoder frames is transmitted every 20 msec. Clients should transmit buffered media at this same rate. Due to the presence of signaling traffic and other delays, it is possible that clients will introduce some jitter to the media at transmission. When a variable-rate vocoder is used, it is also possible that clients transfer media at sustained rates that are faster than one frame every 20 msec since the variable-rate media data-rate (with aggregated headers) is lower than the capacity of the corresponding traffic channel. To avoid overwhelming listener client traffic channels and play-out buffers, talker clients should not make sustained media transmissions at rates faster than the nominal one frame every 20 msec frame-rate. Similarly, the communication server 32 should rebroadcast media at the same rate at which it was received, on average.

In one embodiment, the client memory 88 must be reserved to implement media buffering. The maximum size of this buffer determines the maximum amount of time the client can buffer media while waiting to receive a PTX grant. For example, if the client encapsulates five vocoder frames per UDP datagram every 100 msec, the client encapsulates vocoder frames using RTP, each UDP payload would be comprised of five half-rate vocoder frames (85 bytes total, 17 bytes each), a media header (1 byte), one RTP header (12 bytes), for a total of 98 bytes every 100 msec. Thus, if the client buffered an RTP header with each RTP media payload, a buffering data rate of 980 bytes/sec or 7840 bps would be generated. To survive an anticipated worst-case delay of 10 seconds between prompting the user to talk and receiving a PTX response from the CM, a buffer of 9800 bytes would be required at the client. Further savings in buffer memory can be achieved if the client does not buffer RTP and media headers with the vocoder frames, at the expense of a slightly more complex client implementation.

Figure 7:
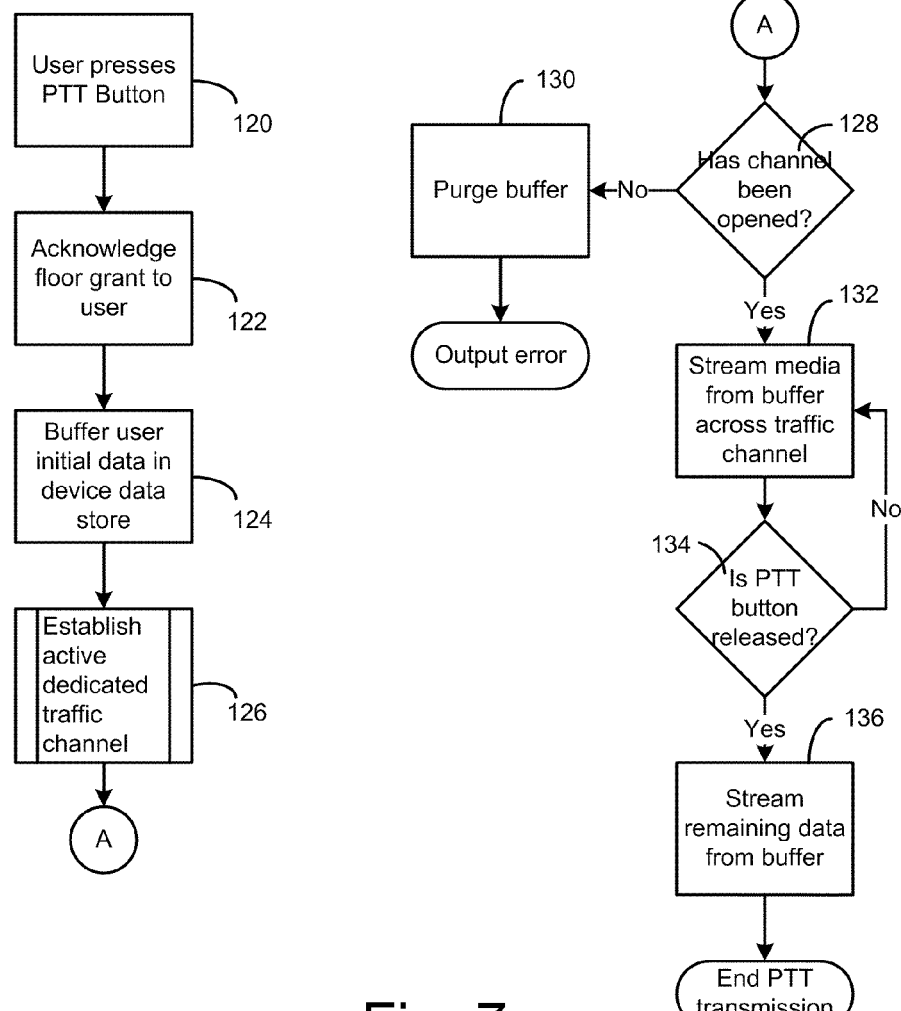
FIG. 7 is a flowchart of one embodiment of a process to buffer initial PTT media at the wireless device data store while an active traffic channel is set up.

FIG. 7 is a flowchart of one embodiment of a process to buffer initial PTT media at the wireless device data store (memory 88) while an active traffic channel is set up. The user presses the PTT button 78, as shown at step 120, and then received a floor grant acknowledge, as shown at step 122, which indicates to the user that he or she can begin to talk. The user initial group communication data is then stored in the device data store (memory 88) as shown at step 124 and a predefined process to establish a dedicated active traffic channel to the wireless device 14,16,18 as shown at predefined step 126 is performed.

A determination is then made as to whether the active traffic channel has been opened to the wireless device 14,16,18, as shown at decision 128. If a channel has not been opened at decision 128, then the buffer is purged as shown at step 130 and the process terminates with an error output to the user. Otherwise, if an active channel has been established at decision 128, then the client device streams media from the buffer across the traffic channel as shown at step 132. A determination is then made as to whether the PTT button 78 is release by the user, as shown at decision 134. If the PTT has not been released, the process iterates to step 132 to continue streaming media. Otherwise, of the PTT has been released at decision 134, then the remaining data in the buffer is streamed to the communication server 32, as shown at step 136, and the PTT transmission terminates.

Figure 8:
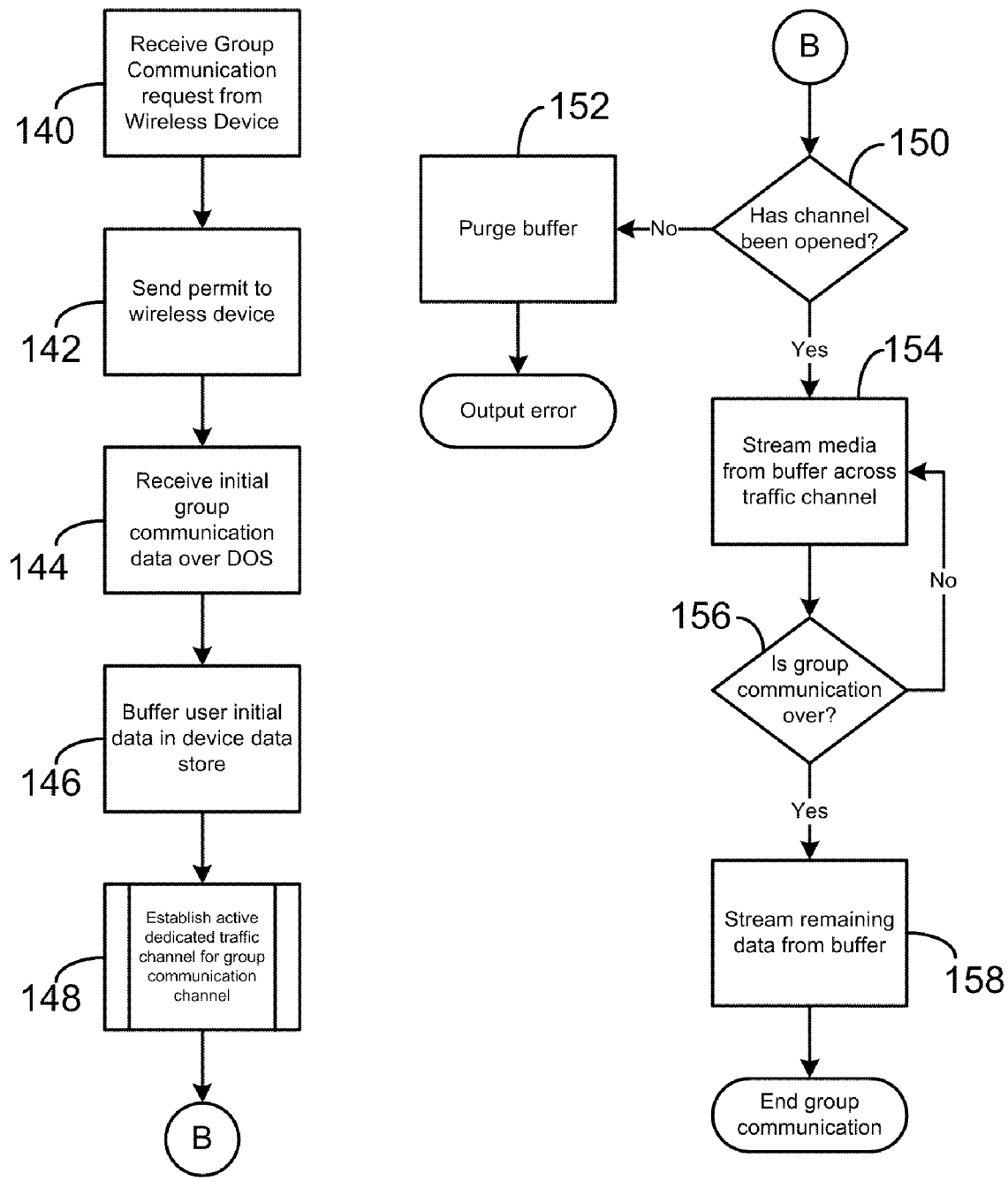
FIG. 8 is a flowchart of one embodiment of the process executing on a group communication server to receive and buffer initial PTT data while the active traffic channel is set up to the wireless device.

FIG. 8 is a flowchart of one embodiment of the process executing on a group communication server 32 to receive and buffer initial PTT data while the active traffic channel is set up to the receiving wireless device. The buffering can occur at the communication server 32 or in an attached data store, such as database 34. The communication server 32 receives group communication request from the wireless device 14,16,18, as shown at step 140, and then sends a permit grant for the wireless device 14,16,18 to begin communication with the communication server 32. Then the communications server 32 begins to receive the initial group communication data from the wireless device, as shown at step 144, here and begins to buffer the initial communication data, as shown at step 146. Then an active dedicated traffic channel is established to the target wireless device 14,16,18, as shown at predefined process 148.

A determination is then made as to whether an active traffic channel has been opened to the receiving wireless device 14,16,18, as shown at decision 150. If the dedicated traffic channel has not been opened at decision 148, any play-out is stopped and the buffer is purged as shown at step 152, and the process terminates with an error output. Otherwise, if a channel has been opened at decision 150, then the media is streamed from the buffer and the group communication is performed as shown at step 154, and then a determination is made as to whether the group communication is over as shown at decision 156. If the group communication stream is not done (i.e. the user has released the PTT button 78) then the process iterates to step 154 to continue streaming media. Otherwise, if the group communication stream has ended at decision 156, then the remaining data in the buffer is sent to the group, as shown at step 158, and the group communication is ended.

It can thus be seen that the system 10 provides a method for buffering initial group communication data from a wireless telecommunication device 14,16,18 on a wireless telecommunication network 20 through the steps of starting a single group communication stream from a sending wireless telecommunication device 14,16,18 to a designated group 12 of the plurality of wireless telecommunication devices across the wireless telecommunication network 20 through a communication server 32, with the sending (and/or receiving) wireless telecommunication device 14 having a dormant state without an open dedicated traffic channel for communications therefrom, and an active state in which the wireless devices has opened a dedicated traffic channel for an outgoing communication. The communication server 32 then selectively receives the incoming group communication streams of data and sends group communication data to other members of the target group 12 for the group communication stream, and buffering at least the initial communication data of a group communication stream in a data store (such as at communication server 32 or memory 88 on the wireless device) from a dormant wireless telecommunication device 14,16,18, with the initial communication data buffered at least while a dedicated traffic channel is opened to the dormant wireless telecommunication device 14,16,18. and then transmitting the buffered initial communication data from the data store to the target group 12 after an active channel is opened to the sending wireless telecommunication device 14, 16,18.

If embodied as having the data store at the wireless telecommunication device, the step of buffering occurs at the wireless telecommunication device 14,16,18. Otherwise, if the data store is at the communication server 32, the step of buffering occurs at the communication server 32 while an active channel is opened to a target wireless device 14,16,18. The step of transmitting the buffered initial group communication data as group communication data can occurs after a predetermined period of time has elapsed, or can occur after an active dedicated traffic channel is opened. The method can also include the step of purging from the data store the buffered initial communication data upon interruption of the group communication, such as with an aborted talk spurt.

The system 10 also includes an inventive wireless telecommunication device (such as wireless telephone 14 shown in FIG. 3). The wireless telecommunication device is able to direct a single group communication stream to a designated group of a plurality of wireless telecommunication devices, such as set 12, and selectively open dedicated broadcast channels to the wireless telecommunication network for an outgoing communication from the wireless telecommunication device for any direct communication stream. The wireless telecommunication device 14,16,18 implements the inventive method to buffer initial group communication data in a data store, such as memory 88 or local database 90.

Another embodiment includes a program resident in a computer readable medium, where the program directs a wireless device having a computer platform to perform the inventive steps of the method. The computer readable medium can be the memory 88 of the computer platform 82 of the wireless telephone 14, or other wireless device, or can be in a local database, such as local database 90 of the wireless telephone 14. Further, the computer readable medium can be in a secondary storage media that is loadable onto a wireless device computer platform, such as a magnetic disk or tape, optical disk, hard disk, flash memory, or other storage media as is known in the art.

In the context of FIGS. 7 and 8, the method may be implemented, for example, by operating portion(s) of the wireless network 20 to execute a sequence of machine-readable instructions, such as wireless platform 82 and the communication server 32. The instructions can reside in various types of signal-bearing or data storage primary, secondary, or tertiary media. The media may comprise, for example, RAM (not shown) accessible by, or residing within, the components of the wireless network 20. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for buffering at a group communication server, the method comprising:
   receiving communication data from a first device, wherein the first device is a wireless device in communication with the group communication server;
   buffering the communication data in a buffer before a determination that a communication path is available to a second device; and
   streaming the communication data from the buffer upon determining that the second device has switched from a dormant state to an active state and the communication path is available to the second device, wherein the second device is a wireless device in communication with the group communication server.

2. The method of claim 1, further comprising:
   receiving a request for a group communication from the first device; and
   granting permission for the first device to send the communication data.

3. The method of claim 2, further comprising:
   detecting the group communication from the first device is completed;
   streaming the communication data remaining in the buffer to the second device responsive to the detection; and
   ending the group communication.

4. The method of claim 1, wherein the first device initiates a group communication.

5. The method of claim 1, wherein buffering comprises:
   storing the communication data at a data store.

6. The method of claim 1, wherein the active state includes the second device having an active traffic channel.

7. The method of claim 1, wherein the second device is a member of a group of target wireless devices, and wherein the communication data is streamed from the buffer to the target wireless devices.

8. The method of claim 1, wherein streaming the communication data from the buffer ceases upon interruption of the group communication.

9. The method of claim 1, wherein the group communication server is responsible for arbitrating a group communication session at least between the first and second devices.

10. The method of claim 9, wherein the communication data corresponds to media to be exchanged between the first and second devices in association with the group communication session.

11. The method of claim 1, wherein the receiving step receives the communication data from the first device at the group communication server via a serving base station of the first device that is separate from the group communication server.

12. A group communication server comprising:
    a buffer configured to receive and buffer communication data from a first device, before a determination that a communication path is available to a second device wherein the first device is a wireless device in communication with the group communication server; and
    a communication portal to stream the communication data from the buffer upon determining that the second device has switched from a dormant state to an active state and the communication path is available to the second device, wherein the second device is a wireless device in communication with the group communication server.

13. The group communication server of claim 12, wherein the group communication server is configured to:
    receive a request for a group communication from the first device; and
    grant permission for the first device to send the communication data.

14. The group communication server of claim 13, wherein the group communication server is configured to:
    detect the group communication from the first device is completed;
    stream the communication data remaining in the buffer to the second device responsive to the detection; and
    end the group communication.

15. The group communication server of claim 12, wherein the first device initiates a group communication.

16. The group communication server of claim 12, wherein the buffer comprises a data store.

17. The group communication server of claim 12, wherein the active state includes the second device having an active traffic channel.

18. The group communication server of claim 12, wherein the second device is a member of a group of target wireless devices, and wherein the communication data is streamed to the target wireless devices.

19. The group communication server of claim 12, wherein the communication portal is a network connection to a wireless communication network.

20. A group communication server comprising:
    means for receiving communication data from a first device, wherein the first device is a wireless device in communication with the group communication server;
    means for buffering the communication data before a determination that a communication path is available to a second device; and
    means for streaming the communication data from the means for buffering upon determining that the second device has switched from a dormant state to an active state and the communication path is available to the second device, wherein the second device is a wireless device in communication with the group communication server.

21. The group communication server of claim 20, further comprising:
   means for receiving a request for a group communication from the first device; and
   means for granting permission for the first device to send the communication data.

22. The group communication server of claim 20, wherein the first device initiates a group communication.

23. The group communication server of claim 20, wherein the means for buffering comprises a data store.

24. A non-transitory computer-readable medium containing instructions that, when executed by a group communication server causes the server to perform the steps of:

receiving communication data from a first device, wherein the first device is a wireless device in communication with the group communication server;
   buffering the communication data in a buffer before a determination that a communication path is available to a second device; and
   streaming the communication data from the buffer upon determining that the second device has switched from a dormant state to an active state and the communication path is available to the second device, wherein the second device is a wireless device in communication with the group communication server.

* * * * *